United States Patent
Watanabe

(10) Patent No.: US 10,807,529 B2
(45) Date of Patent: Oct. 20, 2020

(54) DRIVING ASSISTANT APPARATUS WITH LANE MARKING

(71) Applicant: AISIN SEIKI KABUSHIKI KAISHA, Kariya-shi, Aichi (JP)

(72) Inventor: Kazuya Watanabe, Anjo (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 151 days.

(21) Appl. No.: 15/755,759

(22) PCT Filed: Sep. 14, 2016

(86) PCT No.: PCT/JP2016/077188
§ 371 (c)(1),
(2) Date: Feb. 27, 2018

(87) PCT Pub. No.: WO2017/057007
PCT Pub. Date: Apr. 6, 2017

(65) Prior Publication Data
US 2019/0023181 A1 Jan. 24, 2019

(30) Foreign Application Priority Data

Sep. 30, 2015 (JP) .................. 2015-192827

(51) Int. Cl.
*H04N 7/18* (2006.01)
*B60R 1/00* (2006.01)
(Continued)

(52) U.S. Cl.
CPC .............. *B60R 1/00* (2013.01); *B60R 11/02* (2013.01); *G06K 9/00798* (2013.01);
(Continued)

(58) Field of Classification Search
CPC ................ B60R 1/00; B60R 2300/105; B60R 2300/305; B60R 2300/804;
(Continued)

(56) References Cited

U.S. PATENT DOCUMENTS

2007/0290823 A1  12/2007  Watanabe et al.
2011/0293145 A1  12/2011  Nogami et al.
(Continued)

FOREIGN PATENT DOCUMENTS

DE  102012022486 A1  8/2013
JP  2007-334566 A  12/2007
(Continued)

OTHER PUBLICATIONS

Communication dated Jul. 3, 2018, from the European Patent Office in counterpart European Application No. 16851181.4.
International Search Report for PCT/JP2016/077188, dated Nov. 22, 2016.

*Primary Examiner* — Richard T Torrente
(74) *Attorney, Agent, or Firm* — Sughrue Mion, PLLC

(57) ABSTRACT

An image processing apparatus for a vehicle includes an additional-image generation portion generating an additional image to be added to a captured image, an output image generation portion generating an output image including the captured image and the additional image. The additional image includes a first marking image indicating a first line being away from an end portion of a vehicle in a vehicle width direction by a vehicle width of the vehicle or longer, the first line being along a vehicle front and rear direction.

4 Claims, 6 Drawing Sheets

(51) Int. Cl.
*B60R 11/02* (2006.01)
*G06K 9/00* (2006.01)
*G08G 1/16* (2006.01)
*H04N 5/272* (2006.01)

(52) U.S. Cl.
CPC ............ *G08G 1/167* (2013.01); *H04N 5/272* (2013.01); *H04N 7/18* (2013.01); *B60R 2300/105* (2013.01); *B60R 2300/305* (2013.01); *B60R 2300/804* (2013.01); *B60R 2300/8046* (2013.01); *B60R 2300/8066* (2013.01)

(58) Field of Classification Search
CPC .... B60R 2300/8046; B60R 2300/8066; B60R 11/02; G06K 9/00798; G08G 1/167; H04N 5/272; H04N 7/18
See application file for complete search history.

(56) References Cited

U.S. PATENT DOCUMENTS

| | | | |
|---|---|---|---|
| 2014/0267415 A1* | 9/2014 | Tang | G06T 11/60 345/633 |
| 2016/0300491 A1* | 10/2016 | Fukuda | G08G 1/167 |
| 2017/0083774 A1* | 3/2017 | Solar | G06K 9/46 |

FOREIGN PATENT DOCUMENTS

| | | |
|---|---|---|
| JP | 2009-29203 A | 2/2009 |
| JP | 5562311 B2 | 7/2014 |
| WO | 2010080610 A1 | 7/2010 |
| WO | 2015/079623 A1 | 6/2015 |

\* cited by examiner

DRIVING ASSISTANT APPARATUS WITH LANE MARKING

CROSS REFERENCE TO RELATED APPLICATIONS

This application is a National Stage of International Application No. PCT/JP2016/077188 filed Sep. 14, 2016, claiming priority based on Japanese Patent Application No. 2015-192827 filed Sep. 30, 2015.

TECHNICAL FIELD

The embodiment of the present invention relates to an image processing apparatus for a vehicle.

BACKGROUND ART

An image processing apparatus is conventionally known, which controls a display apparatus such that a camera image is displayed in a manner that the displayed camera image is like an image reflected on a door mirror.

DOCUMENT OF PRIOR ART

Patent Document

Patent document 1: JP5562311B

OVERVIEW OF INVENTION

Problem to be Solved by Invention

In the image processing apparatus of this type, for example, a partition line on a road may not be seen easily under circumstance where visibility is poor due to, for example, rainfall and/or snow accumulation, and/or where abrasion is generated on the partition line. One of the problems to be solved by an embodiment of the present invention is to obtain an output image in which a position and/or a distance of an own vehicle relative to the surroundings are easily grasped even under the circumstance that, for example, the partition line on the road is not easily visible.

Means for Solving Problem

For example, an image processing apparatus for a vehicle of the embodiment includes an additional-image generation portion generating an additional image to be added to a captured image, and an output image generation portion generating an output image including the captured image and the additional image. The additional image includes a first marking image indicating a first line being away from an end portion of a vehicle in a vehicle width direction by a vehicle width of the vehicle or longer, and the first line is along a vehicle front and rear direction. Consequently, according to the present embodiment, for example, a user easily grasps a distance in the vehicle width direction from an own vehicle to other vehicle and/or a distance from the own vehicle to an object, by comparing the other vehicle/and or the object with the first line.

In addition, for example, the above-described image processing apparatus for a vehicle includes a partition line detection portion detecting a partition line on a road, wherein in a case where the partition line is not detected by the partition line detection portion, the additional-image generation portion generates the first marking image serving as the additional image. Consequently, in a case where it is difficult for the user to visually recognize the partition line, the user easily grasps the distance in the vehicle width direction from the own vehicle to the other vehicle and/or the distance from the own vehicle to the object, by comparing the other vehicle/and or the object with the first line.

In addition, in the above-described image processing apparatus for a vehicle, for example, the additional image includes a second marking image indicating a second line arranged between the end portion of the vehicle in the vehicle width direction and the first line, and the second line is along the vehicle front and rear direction. Consequently, for example, the user grasps the distance in the vehicle width direction from the own vehicle to the other vehicle and/or the distance from the own vehicle to the object even more easily, by comparing the other vehicle/and or the object with the first line and the second line.

In addition, in the above-described image processing apparatus for a vehicle, for example, the additional image includes a third marking image indicating a band-shaped region positioned in the vehicle width direction of the vehicle and extended in the vehicle front and rear direction. Consequently, for example, the user easily grasps the distance in the vehicle width direction from the own vehicle to the other vehicle and/or the distance from the own vehicle to the object, by comparing the other vehicle and/or the object with the band-shaped region.

In addition, in the above-described image processing apparatus for a vehicle, for example, the additional image includes a first additional image indicating an object positioned within a predetermined distance from the vehicle. Consequently, for example, due to the first additional image, the user easily grasps the presence of the object which is near the own vehicle.

MODE FOR CARRYING OUT THE INVENTION

An exemplary embodiment of the present invention and variations thereof will be disclosed below. The configurations of the embodiment and the variations, and operations, results and effects which are obtained by the configurations, as are described below, are examples. The present invention can be implemented with a configuration other than the configurations disclosed in the embodiment and the variations which are disclosed below. In addition, according to the present invention, at least one of the various effects and/or derivative effects which are obtained from the configurations may be obtained.

In addition, the embodiment and the examples that will be disclosed below include similar constituent features or structural members to each other. The similar constituent features or structural members will be given common numerical references and duplicated explanations will be omitted hereunder.

Figure 1:
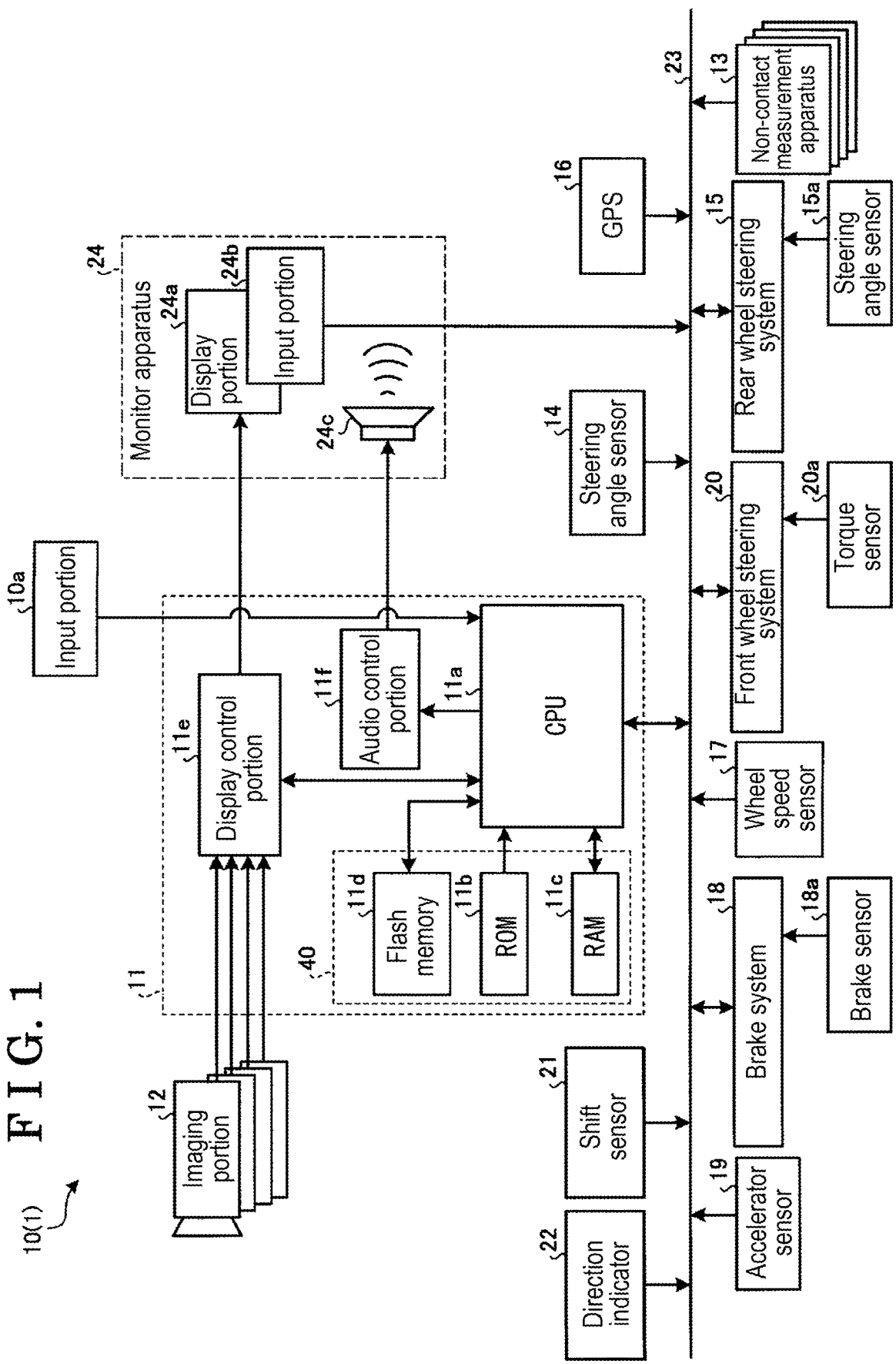
FIG. 1 is an exemplary schematic configuration diagram of an image display system according to an embodiment.

FIG. 1 is an exemplary schematic configuration view of an image display system. As illustrated in FIG. 1, an image display system 10 provided at a vehicle 1 includes an ECU 11 (an electronic control unit). The ECU 11 performs image processing on a captured image taken by an imaging portion 12, and generates an output image. The ECU 11 controls a display portion 24a such that the output image is displayed. The ECU 11 is an example of an image processing apparatus or a display control portion.

(Image display system) First, the image display system 10 will be described. The image system 10 generates an output image Io illustrated, for example, in FIG. 4 and the subsequent drawings. The image display system 10 may display the output image Io according to circumstances of the vehicle 1. The image display system 10 may be incorporated or included in a system in which the output image Io is used to control the vehicle 1, such system including a drive assist system and/or a park assist system, for example.

As illustrated in FIG. 1, apparatuses and/or electric components which are included in the image display system 10 are electrically or communicably connected to each other via, for example, an in-vehicle network 23. The apparatuses and/or electric components include a non-contact measurement apparatus 13, a steering angle sensor 14, a steering angle sensor 15a, a GPS 16, a wheel speed sensor 17, a brake sensor 18a, an accelerator sensor 19, a torque sensor 20a, a shift sensor 21, a direction indicator 22 and/or an input portion 24b, for example. The in-vehicle network 23 is CAN (a controller area network), for example. The electric components may be electrically or communicably connected to each other via other than the CAN.

The imaging portion 12 is a digital camera including a built-in imaging element such as CCD (a charge coupled device) and/or CIS (a CMOS image sensor), for example. The imaging portion 12 may output image data, that is, video image data or moving image data, at a predetermined frame rate.

Figure 2:
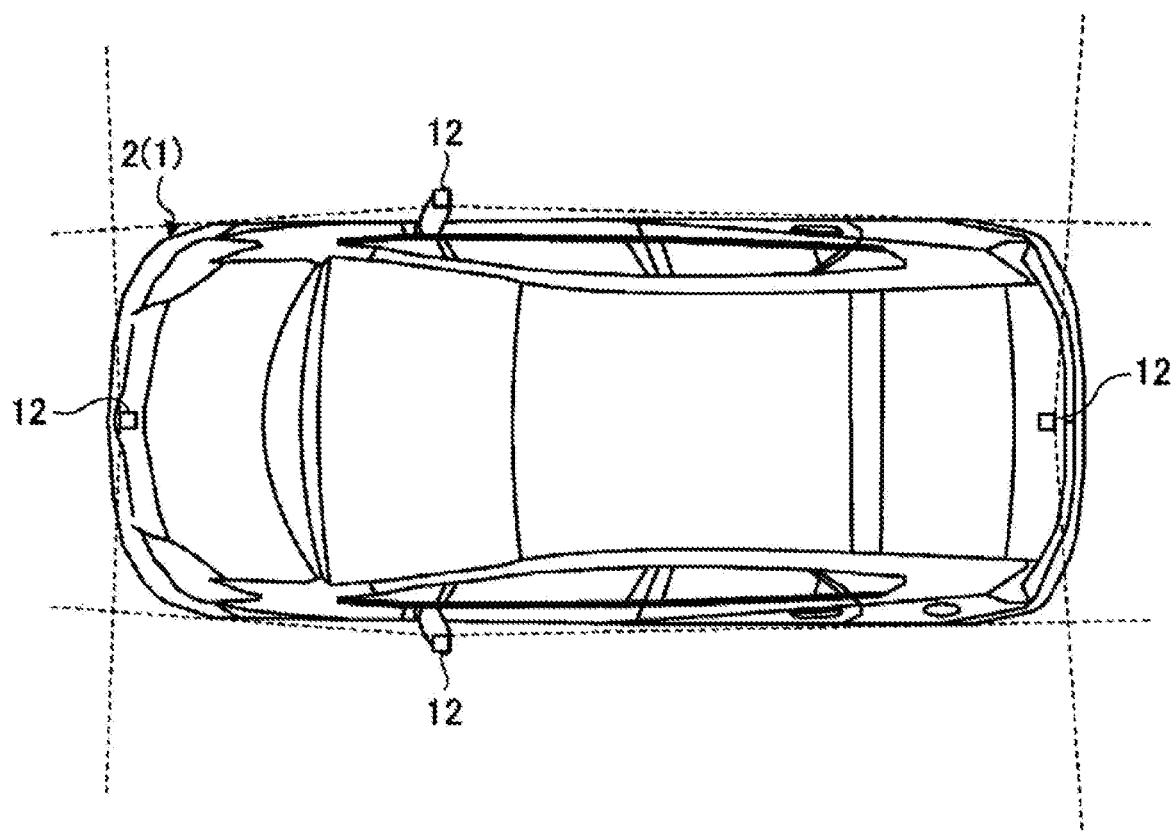
FIG. 2 is a plane view illustrating an example of an imaging range by an imaging portion of the image display system of the embodiment.

FIG. 2 is a plane view illustrating an example of an imaging range of the imaging portion 12. As exemplarily illustrated in FIG. 2, a vehicle body 2 is provided with the imaging portions 12 taking images of the outside of the vehicle, which are provided at a front portion, a right side portion, a left side portion and a rear portion of the vehicle body 2 respectively. The imaging portion 12 provided at the front portion of the vehicle body 2 may be attached to a radiator grill, for example. The imaging portions 12 provided at the right and left side portions of the vehicle body 2 are attached to door mirrors, respectively, for example. The imaging portion 12 provided at the rear portion of the vehicle body 2 is attached to a rear hatch door, for example. For example, the imaging portions 12 may be provided at right and left corners of a rear end portion of the vehicle body 2, respectively, which are not shown. The imaging portion 12 is a wide angle lens or a fisheye lens, for example. The imaging portion 12 obtains data of the captured image of surroundings of the vehicle body 2 (the vehicle 1). Three or less imaging portions 12, or five or more imaging portions 12 may be provided. The imaging ranges of the respective imaging portions 12 may differ from each other.

For example, the non-contact measurement apparatus 13 is sonar and/or a radar which emits supersonic waves and/or electric waves, and catches the reflected waves. The ECU 11 may measure presence or absence of an obstacle positioned in a periphery of the vehicle 1, and/or a distance to the obstacle, on the basis of a detection result of the non-contact measurement apparatus 13. That is, the non-contact measurement apparatus 13 may be referred to also as an object detection portion and/or a distance measuring portion.

The steering angle sensor 14 is a sensor detecting a steering amount of a steering wheel which serves as a steering portion and is not shown. The steering angle sensor 14 is formed by Hall element, for example. The steering angle sensor 15a is a sensor detecting a steering amount of a rear wheel. The steering angle sensor 15a is formed by Hall element, for example. The steering amount is detected as an angle of rotation, for example.

The GPS 16 (the global positioning system) may acquire the current position on the basis of radio waves received from satellite.

The wheel speed sensor 17 is a sensor detecting an amount of rotation of the wheel and/or the number of rotations per unit time of the wheel. The wheel speed sensor 17 is formed by Hall element, for example. The ECU 11 is configured to calculate, for example, an amount of movement of the vehicle 1 on the basis of data obtained from the wheel speed sensor 17. The wheel speed sensor 17 may be provided at a brake system 18.

For example, the brake system 18 is ABS (an anti-lock brake system) which restricts locking of the braking, an antiskid system (ESC: an electronic stability control) which restricts the vehicle 1 from skidding at cornering, and/or an electric brake system which intensifies a braking force, BBW (a brake by wire). The brake system 18 applies a braking force to the wheels via an actuator that is not shown, and decelerates the vehicle 1. The brake sensor 18a is a sensor detecting an operation amount of the brake pedal, for example.

The accelerator sensor 19 is a sensor detecting an operation amount of an accelerator pedal. The torque sensor 20a detects torque applied to the steering portion by a driver. For example, the shift sensor 21 is a sensor detecting a position of a movable portion of a shift operation portion and is configured with the use of a displacement sensor, for example. The movable portion is a lever, an arm and/or a button, for example. The configurations, the arrangements, the electrical connection modes and so forth of the sensors and/or actuators which are described above are examples, and may be set or changed in various ways. The direction indicator 22 outputs signals instructing lighting on, lighting off and flashing of the directional light, for example.

The image display system 10 may include an input portion 10a. In this case, the input portion 10a may be configured as a push button, a switch, a tab or the like, for example.

A monitor apparatus 24 includes the display portion 24a, the input portion 24b and an audio output apparatus 24c. The display portion 24a is an LCD (a liquid crystal display), for example. The audio output apparatus 24c is a loudspeaker, for example. The input portion 24b is transparent and covers the display portion 24a. The input portion 24b is a touch panel or touch screen, for example. A user can visually recognize an image displayed on a display screen of the display portion 24a via the input portion 24b. The user can perform input by operating the input portion 24b, for example, by touching, pushing or moving with his/her finger, at a position corresponding to the image displayed on the display screen of the display portion 24a, for example. For example, the display portion 24a, the input portion 24b and/or the audio output apparatus 24c are provided at the monitor apparatus 24 arranged at a central portion of a dashboard in a vehicle width direction, that is, in a right and left direction. The monitor apparatus 24 may include an input portion that is not shown, including a switch, a dial, a joystick and/or a push button, for example. The monitor apparatus 24 is used also for a navigation system and/or an audio system.

The ECU 11 includes a CPU 11a (a central processing unit), ROM 11b (read only memory), RAM 11c (random access memory), a flash memory 11d, a display control portion 11e, an audio control portion 11f, for example. The flash memory 11d may be SSD (a solid state drive). The CPU 11a may perform various calculations. The CPU 11a may read out program installed and stored in a non-volatile storage device including the ROM 11b and/or the flash memory 11d, and may perform arithmetic processing in accordance with the program. The RAM 11c temporarily stores various data used in the calculations performed at the CPU 11a. The flash memory 11d is a rewritable non-volatile storage portion and may store data even in a case where power of the ECU 11 is turned off. For example, the display control portion 11e may mainly perform general image processing using the image data obtained at the imaging portion 12 and/or general image processing of image data to be displayed at the display portion 24a. The audio control portion 11f may mainly perform processing of audio data outputted at the audio output apparatus 24c. For example, the CPU 11a, the ROM 11b and/or the RAM 11c may be integrated in one same package. For example, the ECU 11 may be configured to use other logical operation processor and/or logic circuit, including a DSP (a digital signal processor), instead of the CPU 11a. Instead of the flash memory 11d, HDD (a hard disk drive) may be provided. The flash memory 11d and/or the HDD may be provided separately from the ECU 11.

Figure 3:
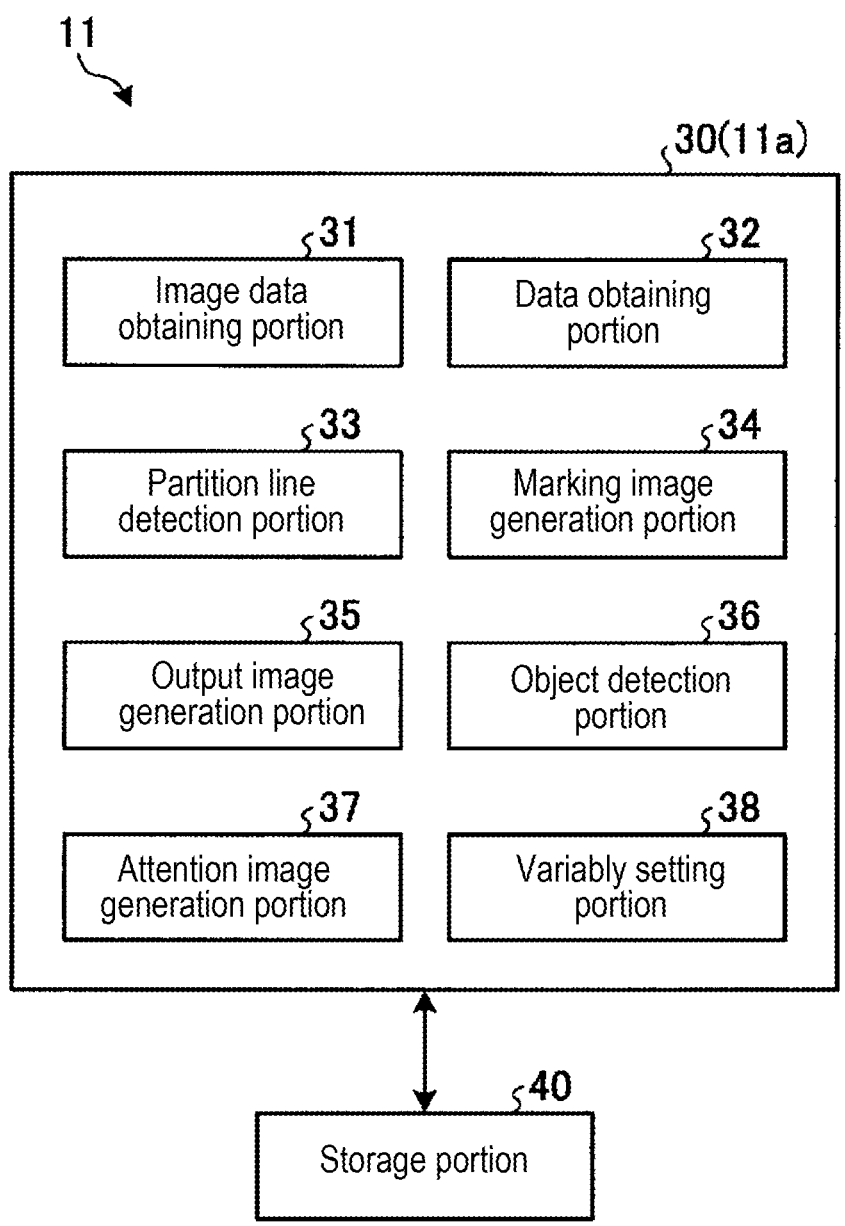
FIG. 3 is an exemplary and schematic block diagram of an image processing apparatus included in the image display system of the embodiment.

FIG. 3 is an exemplary and schematic block diagram of the ECU 11. The ECU 11 may function as the image processing apparatus in which the hardware and the software (the program) cooperate with each other. The ECU 11 may include the display control portion 11e and/or the audio control portion 11f as illustrated in FIG. 1, and the ECU 11 may also include an image processing portion 30 and a storage portion 40 as illustrated in FIG. 3. The image processing portion 30 may be configured by the CPU 11a, for example. In this case, the CPU 11a functions as various portions of the image processing portion 30. That is, the various portions include an image data obtaining portion 31, a data obtaining portion 32, a partition line detection portion 33, a marking image generation portion 34, an output image generation portion 35, an object detection portion 36, an attention image generation portion 37 and a variably-setting portion 38, for example. The storage portion 40 includes the ROM 11b, the RA 11c and the flash memory 11d. At least part of the image processing performed at the image processing portion 30 may be performed at the display control portion 11e. Each of the portions of the image processing portion 30 may correspond to a module of the program and/or at least part of the image processing portion 30 may be configured as the hardware.

The image data obtaining portion 31 obtains data of plural captured images taken by the plural imaging portions 12.

The data obtaining portion 32 obtains data other than the captured image. Such date includes data inputted by the input portions 24b, 10a and/or data of detection results of sensors, for example.

The partition line detection portion 33 detects a partition line from the data of the captured images taken by the imaging portion 12 by way of image processing. By way of the image processing on the data of the captured images, the partition line may be detected on the basis of whether or not a condition is satisfied, the condition which includes, for example, a position, a size, a shape, an inclination and a color of the image performed with grouping and labeling, for example.

The marking image generation portion 34 generates a marking image which is to be included, together with the captured image, in the output image. The marking image is added for the purpose of a reference for the user to grasp positions of an own vehicle and the surroundings, and/or a distance from the own vehicle to the surroundings, in the output image.

Figure 4:
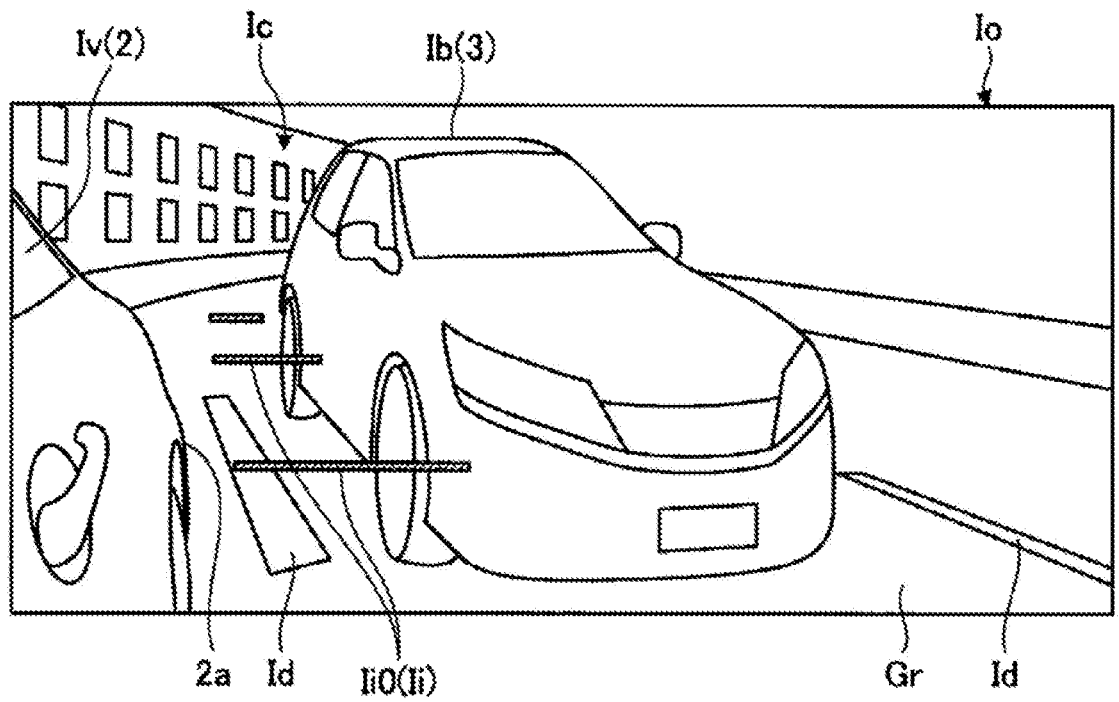
FIG. 4 is a view illustrating an example of an output image by the image display system of the embodiment.

The output image generation portion 35 generates the output image including the captured image and the marking image. FIG. 4 is a view illustrating an example of the output image Io. The output image Io includes a captured image Ic and a marking image Ii (Ii0).

The captured image Ic is an image based on the captured image taken by the imaging portion 12 provided at the door mirror, and the captured image Ic is made like a mirror image or mapped image reflected in the door mirror. In the example of FIG. 4, an infinite convergence point of the captured image Ic is set at the upper left side of a display region, and the front side in a vehicle front-and-rear direction extends from the convergence point in a radiation direction. The captured image Ic includes an image Iv of the vehicle 1 (the own vehicle) including an end portion 2a of the vehicle body 2 in the vehicle width direction, an image Ib of other vehicle 3 (an object) and an image Id of the partition line, for example. The captured image Ic may be an image converted with, for example, a coordinate conversion, a viewpoint conversion, a projection conversion, and/or may be an image on which image processing has been performed, the image processing which includes adjustment of brightness, definition, size, for example.

The marking image Ii0 is a line (a line segment) extended in the vehicle width direction. Plural marking images Ii0 are arranged to be spaced away from each other in the vehicle front-and-rear direction, for example, to be equally spaced away from each other. The marking image Ii may be a transparent image through which the captured image Ic is transmitted.

In the output image Io of FIG. 4, the user easily grasps a distance and/or a position of the other vehicle 3 relative to the vehicle 1 (the own vehicle) due to the marking image Ii0. In addition, the user easily grasps a distance between the vehicle 1 and the other vehicle 3 in the vehicle width direction due to the image Id of the partition line.

In a case where the image Id of the partition line can be visually recognized as in FIG. 4, the user can easily grasp the distance in the vehicle width direction from the vehicle 1 to the other vehicle 3 on the basis of the image Id of the partition line. In contrast, in a case where it is difficult for the user to see the image Id of the partition line due to a poor visibility, for example, because of influence of weather, the user cannot easily grasp the distance in the vehicle width direction from the vehicle 1 to the other vehicle 3.

Figure 5:
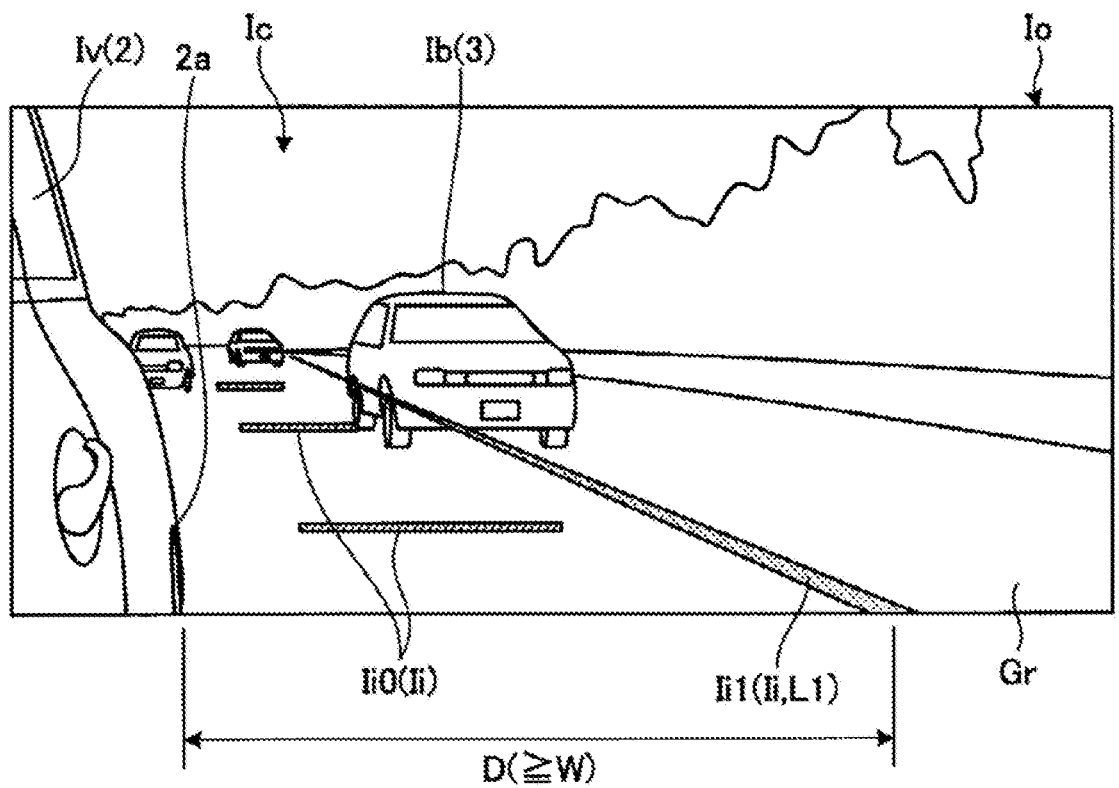
FIG. 5 is a view illustrating an example of the output image by the image display system of the embodiment.

In the present embodiment, in a case where the partition line is not detected at the partition line detection portion 33, the marking image generation portion 34 generates the marking image Ii1 which is positioned in the vehicle width direction relative to the vehicle 1 and is arranged along the vehicle front-and-rear direction. An example of the output image Io in the above-described case is illustrated in FIG. 5.

The above-described output image Io includes the captured image Ic, the marking image Ii0 along the vehicle width direction, and the marking image Ii1 along the vehicle front-and-rear direction. Thus, the user easily grasps the distance from the vehicle 1 to the other vehicle 3 in the vehicle width direction by referring to the marking image Ii1 even in a case where the image of the partition line is not easily seen.

For example, the marking image Ii1 indicates a line L1 (a first line) which is away from the end portion 2a of the vehicle body 2 in the vehicle width direction by a distance D and is arranged along the vehicle front-and-rear direction, on a ground surface Gr which is flat and on which the vehicle 1 is placed. The distance D is equal to or longer than a vehicle width W of the vehicle 1. In the example of FIG. 5, the marking image Ii1 is a band-shaped region which is along the line L1 and a center of which corresponds to the line L1. In this case, the user can distinguish other vehicle 3 which is farther than the marking image Ii1 and of which an influence is relatively small, and other vehicle 3 which is closer than the marking image Ii1 and of which the influence is relatively great. The marking image generation portion 34 is an example of an additional-image generation portion. The marking image Ii is an example of an additional image added to the captured image Ic. The marking image Ii1 is an example of a first marking image.

The object detection portion 36 detects, from the captured image Ic, an object which is positioned within a predetermined distance from the vehicle 1 (the own vehicle), and such an object includes the other vehicle 3, for example. For example, the object may be detected on the basis of whether or not a condition is satisfied, the condition which includes, for example, a position, a size, a shape, an inclination and a color of the image performed with grouping and labeling, by image processing in the data of the captured image Ic. The object detection portion 36 may detect the object positioned within the predetermined distance from the vehicle 1 on the basis of the detection result of the non-contact measurement apparatus 13. The distance to the object which is to be detected by the object detection portion 36 may be set arbitrarily.

In a case where the object detected by the object detection portion 36 is positioned within the predetermined distance from the vehicle 1, the attention image generation portion 37 generates an attention image indicating the object. In this case, the output image generation portion 35 includes the attention image into the output image Io.

Figure 6:
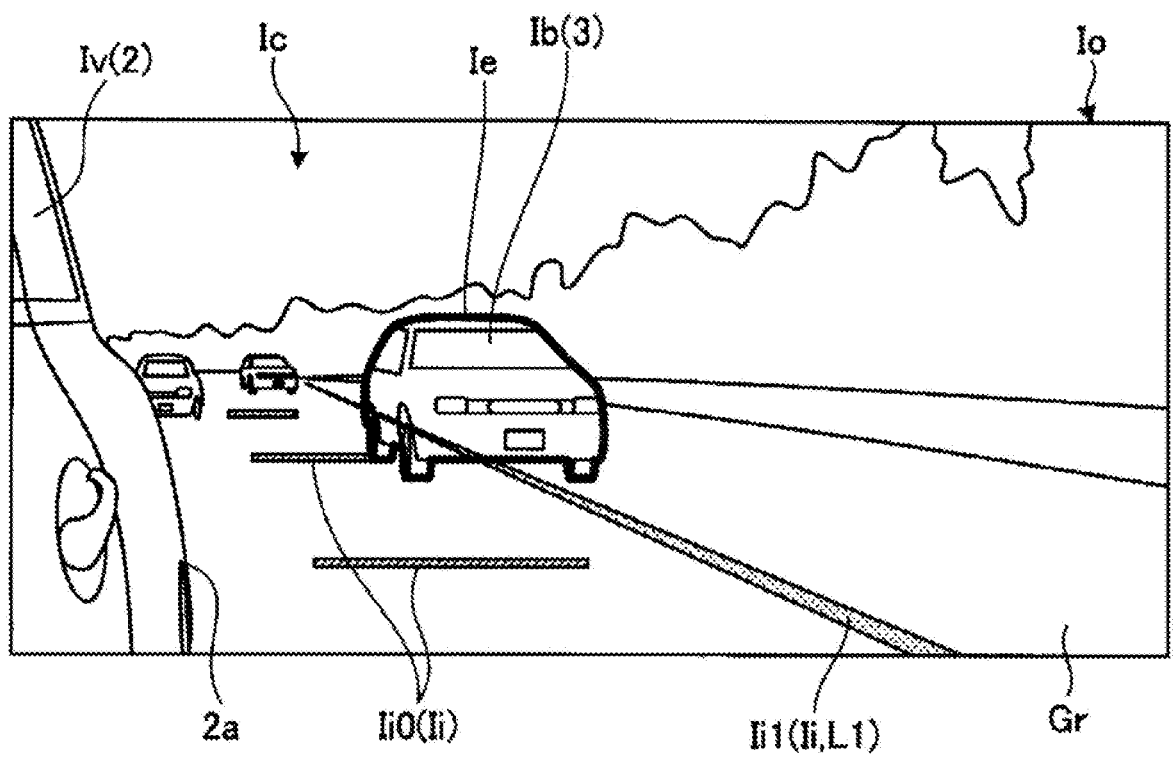
FIG. 6 is a view illustrating an example of the output image by the image display system of the embodiment.

FIG. 6 is a view illustrating an example of the output image Io by the image display system 10. The output image Io includes the captured image Ic, the marking image Ii0 arranged along the vehicle width direction, and the marking image Ii1 arranged along the vehicle front-and-rear direction, in a similar manner to the example of FIG. 5. In addition, the output image Io illustrated in FIG. 6 includes an attention image Ie corresponding to the other vehicle 3. The attention image Ie is generated to correspond to an object which is extracted from the captured image Ic via the image processing and includes a size that is equal to or larger than a predetermined size. In the example of FIG. 6, the attention image Ie is a line including a predetermined width and superimposed on an edge of the other vehicle 3 serving as the object. Specifications, including, a kind of line, a shape and brightness, of the attention image Ie are different from specifications of the marking images Ii0, Ii1. Accordingly, the user can easily grasp the object, for example, the other vehicle 3, which is closer or nearer than the predetermined distance. In a case where the marking image Ii1 indicating the first line is included in the output image Io, the attention image generation portion 37 may switch whether or not the attention image is to be included, in accordance with large or small relative to the magnitude of the distance in the vehicle width direction from the object to the first line in the vehicle width direction. In this case, in a case where the distance to the object is within the predetermined distance, regardless of the presence or absence of the marking image Ii1 in the output image Io, the attention image generation portion 37 may generate the attention image Ie and the output image generation portion 35 may include the attention image Ie into the output image Io. The attention image generation portion 37 is an example of the additional-image generation portion. The attention image Ie is an example of a first additional image.

Figure 7:
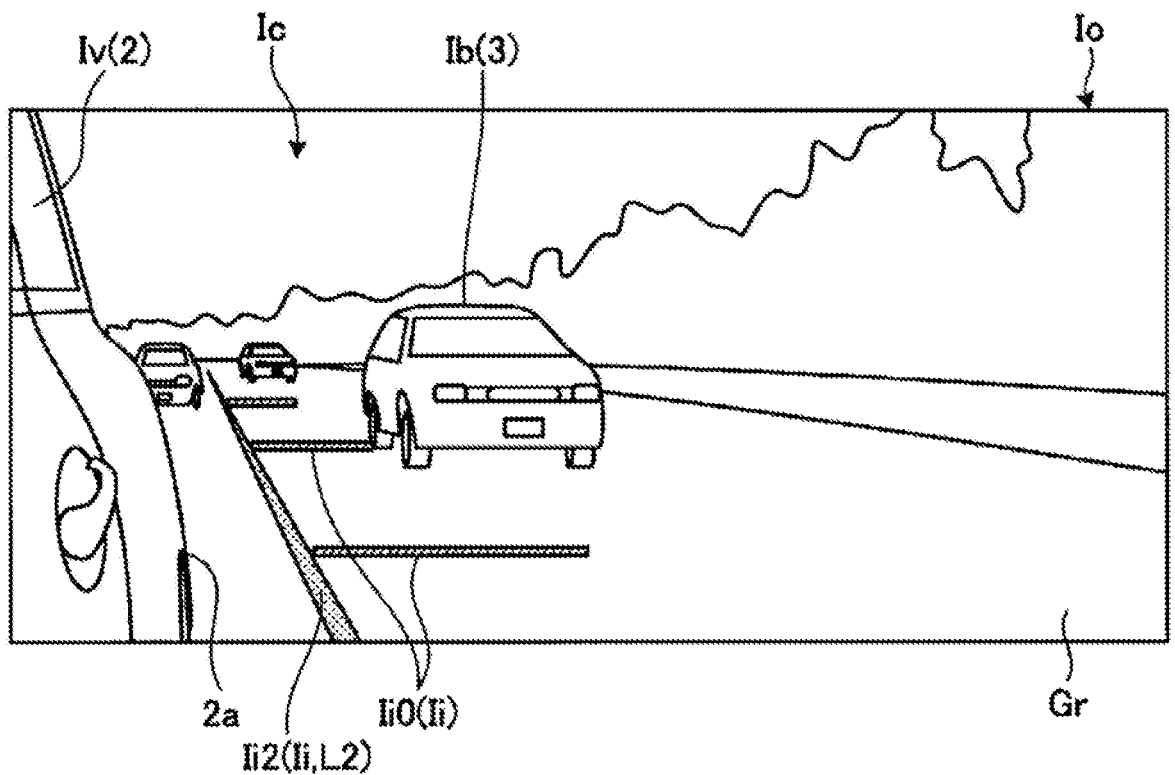
FIG. 7 is a view illustrating an example of the output image by the image display system of the embodiment.
Figure 8:
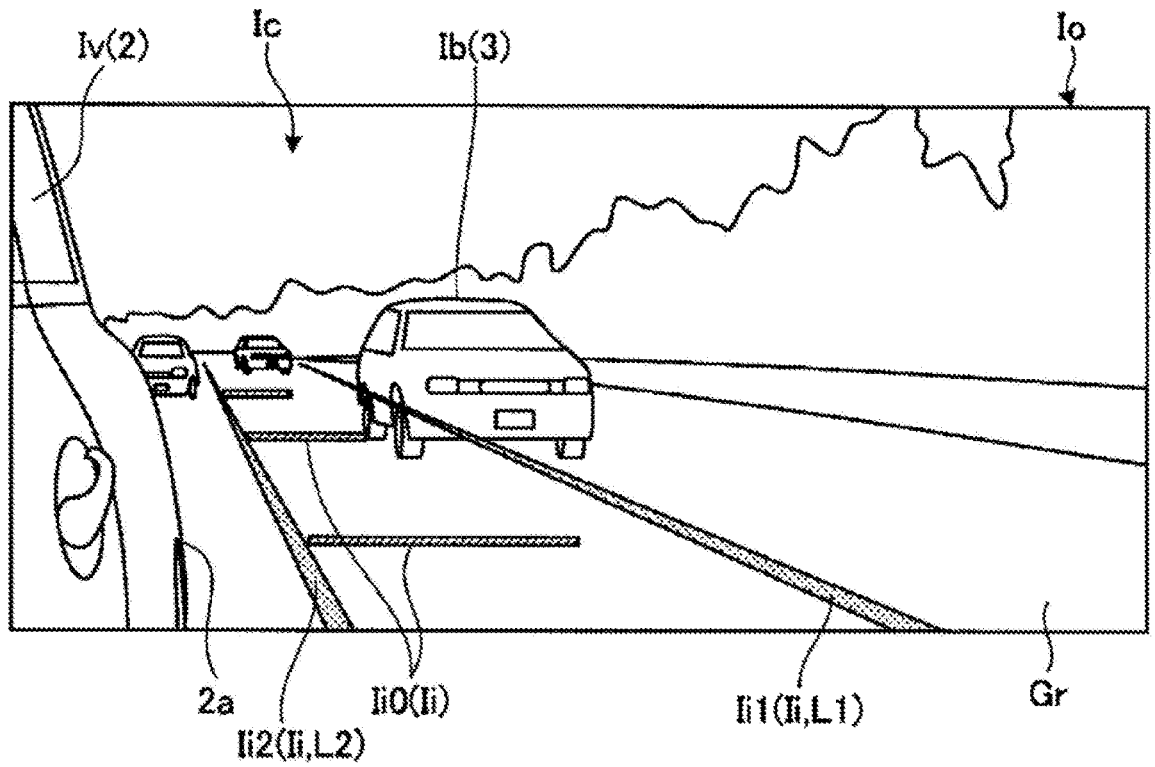
FIG. 8 is a view illustrating an example of the output image by the image display system of the embodiment.
Figure 9:
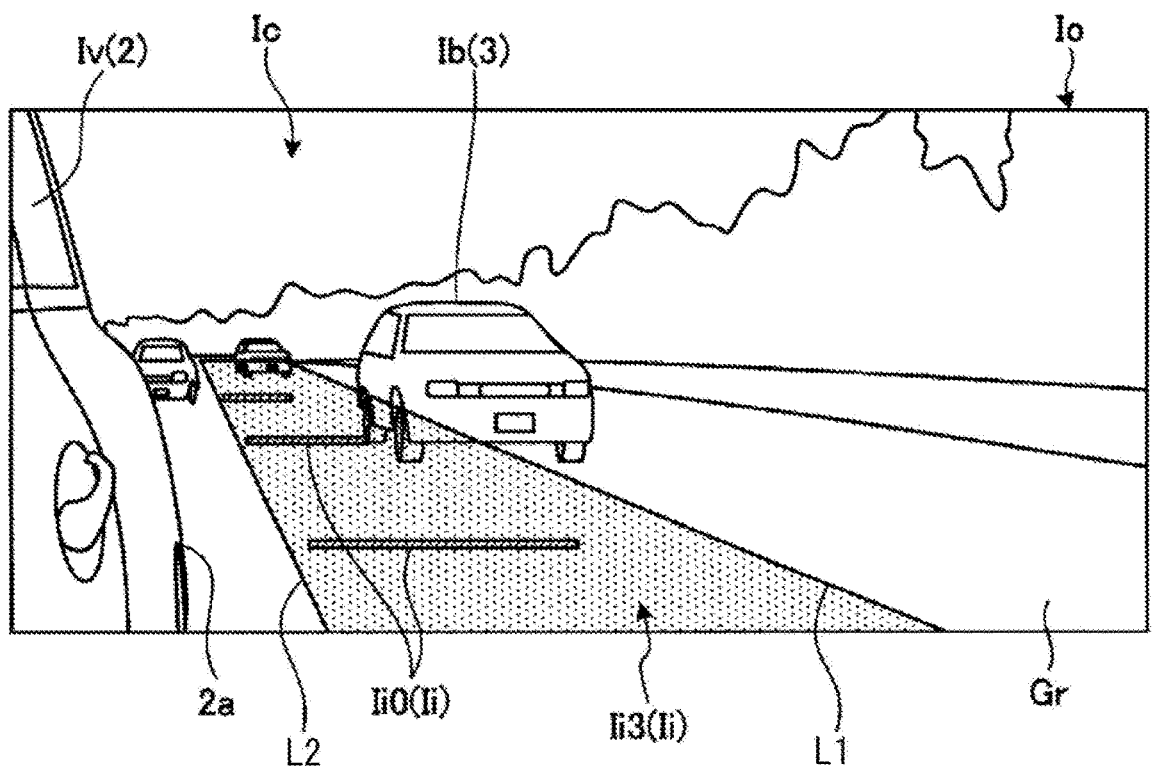
FIG. 9 is a view illustrating an example of the output image by the image display system of the embodiment.

Each of FIGS. 7 to 9 is a view illustrating an example of the output image Io by the image display system 10. The marking image Ii2 illustrated in the example of FIG. 7 indicates a second line L2 arranged between the end portion 2a of the vehicle body 2 (the vehicle 1) in the vehicle width direction and the first line L1 corresponding to the marking image Ii1 (FIGS. 5 and 6), and the second line L2 is arranged along the vehicle front-and-rear direction. The marking image Ii2 is an example of a second marking image. The example of the output image Io in FIG. 8 includes the marking image Ii1 which is similar to the marking image indicated in each of FIGS. 5 and 6, and the marking image Ii2 which is similar to the marking image indicated in FIG. 7. The example of the output image Io in FIG. 9 includes the marking image Ii3 which includes a wider band shape. An end portion of the marking image Ii3, the end portion which is at a far side from the vehicle 1, overlaps with the first line L1 corresponding to the marking image Ii1 (FIGS. 5 and 6), and another end portion of the marking image Ii3, the end portion which is at a close side to the vehicle 1, overlaps with the second line L2 corresponding to the marking image Ii2 (FIGS. 7 and 8). The marking image Ii3 is an example of a third marking image. Thus, the marking image Ii can be indicated in various manners. The marking image Ii1, Ii2, Ii3 may be included in the output image Io in a case where the partition line is not detected by the partition line detection portion 33, and does not need to be included in the output image Io in a case where the partition line is detected. The marking image Ii1, Ii2, Ii3 may be included in the output image Io regardless of the detection result of the partition line by the partition line detection portion 33.

The variably-setting portion 38 may change the marking image Ii to be included in the output image Io. The change of the marking image Ii which is made by the variably-setting portion 38 may be performed on the basis of data inputted via operation performed to the input portions 24b, 10a by the user. Thus, the marking image Ii which is selected according to preference of the user is set. For example, the variably-setting portion 38 may change the marking image Ii depending on the detection results, the signal and/or the data by the sensor and/or device of the vehicle 1. The sensor and/or device include the non-contact measurement apparatus 13, the steering angle sensors 14, 15a, the GPS 16, the brake sensor 18a, the accelerator sensor 19, the torque sensor 20a, the shift sensor 21 and the direction indicator 22, for example.

As described above, in the present embodiment, for example, the marking image generation portion 34 (the additional-image generation portion) generates the marking image Ii1, Ii2, Ii3 (the additional image) positioned in the vehicle width direction of the vehicle 1 so as to be arranged along the vehicle front-and-rear direction. The output image generation portion 35 causes the marking image Ii1, Ii2, Ii3 to be included into the output image Io. Thus, according to the present embodiment, for example, the user easily grasps a position of the vehicle 1 relative to the surroundings and/or a distance from the vehicle 1 to the surroundings, by reference to the marking image Ii1, Ii2, Ii3.

In addition, according to the present embodiment, for example, the output image generation portion 35 causes the marking image Ii1, Ii2, Ii3 to be included in the output image Io in a case where the partition line detection portion has not detected the partition line. Thus, according to the present embodiment, for example, in the captured image Ic, in a case where the partition line is not visually recognized easily, the user can easily grasp the positions of the vehicle 1 and the surroundings relative to each other and/or the distance from the vehicle 1 to the surroundings by referring to the marking image Ii1, Ii2, Ii3.

In addition, according to the present embodiment, for example, the marking image Ii included in the output image Io includes the marking image Ii1 (the first marking image) indicating the first line L1. The first line L1 is apart from the end portion 2a of the vehicle body 2 (the vehicle 1) in the vehicle width direction by the distance D equal to or larger than the vehicle width W of the vehicle 1, and is arranged along the vehicle front-and-rear direction. Accordingly, for example, the use easily grasps the distance from the vehicle 1 (the own vehicle) to the other vehicle 3 and/or the object in the vehicle width direction, by comparing the other vehicle 3 and/the object with the first line L1.

In addition, according to the present embodiment, for example, the marking image Ii included in the output image Io includes the marking image Ii2 (the second marking image). The marking image Ii2 indicates the second line L2 that is arranged in the vehicle front-and-rear direction and is arranged between the end portion 2a of the vehicle body 2 (the vehicle 1) in the vehicle width direction and the first line L1. Accordingly, for example, the user grasps even more easily the distance from the vehicle 1 (the own vehicle) to the other vehicle 3 and/or to the object in the vehicle width direction, by comparing the other vehicle 3 and/or the object with the first line L1 and the second line L2.

In addition, according to the present embodiment, for example, the marking image Ii included in the output image Io includes the marking image Ii3 (the third marking image) indicating the band-shaped region positioned in the vehicle width direction of the vehicle 1 and extended in the vehicle front-and-rear direction. Accordingly, for example, the use grasps even more easily the distance from the vehicle 1 (the own vehicle) to the other vehicle 3 and/or to the object in the vehicle width direction, by comparing the other vehicle 3 and/or the object with the band-shaped region positioned between the first line L1 and the second line L2.

In addition, according to the present embodiment, for example, the output image Io includes the attention image Ie (the first additional image) indicating the object positioned within the predetermined distance (for example, W) from the vehicle 1. Accordingly, for example, due to the attention image Ie, the user easily grasps the presence of the object which is close to the vehicle 1 (the own vehicle).

The aforementioned embodiment of the present invention is an example and is not intended to limit the scope of the invention. The embodiment may be carried out in other various modes, and various omissions, replacements, combinations and changes may be made without departing from the scope of the invention. Also the embodiment may be carried out in a state where the configurations and/or shapes in each embodiment are partly changed with each other. In addition, the specifications (for example, a configuration or structure, a kind, a direction, a shape, a size, a length, a width, a thickness, a height, the number, an arrangement, a position, a color, a pattern) of each configuration and/or shape can be appropriately changed and be carried out.

The output image (the displayed image) may be displayed on plural display apparatuses and/or may be displayed on a display apparatus which is separate from the navigation system, for example. The display apparatus may be an apparatuses which reflects an image onto, for example, a windshield and/or a screen inside a vehicle cabin. The display apparatus may be a display panel provided at the dashboard and/or a center console inside the vehicle cabin, for example. The display panel may be provided at a cockpit module, an instrumental panel and/or a fascia, for example.

EXPLANATION OF REFERENCE NUMERALS

1 . . . vehicle, 2 . . . vehicle body, 2a . . . end portion, 11 . . . ECU (image processing apparatus), 33 . . . partition line detection portion, 34 . . . marking image generation portion (additional-image generation portion), 35 . . . output image generation portion, Io . . . output image, Ic . . . captured image, Id . . . (image of) partition line, Ii . . . marking image (additional image), Ii1 . . . marking image (first marking image), Ii2 . . . marking image (second marking image), Ii3 . . . marking image (third marking image), Ie . . . attention image (first additional image, additional image), L1 . . . first line, L2 . . . second line, W . . . vehicle width

The invention claimed is:

1. An image processing apparatus for a vehicle, the apparatus comprising:
    an additional-image generation portion generating an additional image to be added to a captured image; and
    an output image generation portion generating an output image including the captured image and the additional image, wherein
    the additional image includes a first marking image indicating a first line and a first additional image indicating an object, the first line being a first distance away in a vehicle width direction from an end portion of a vehicle in the vehicle width direction, the first distance being equal to or longer than a vehicle width of the vehicle, and the first line being along a vehicle front and rear direction, and
    the additional-image generation portion generates the first additional image based on an object extracted from the captured image in a case where it is determined that the object extracted from the captured image is positioned within a predetermined distance from the vehicle in the vehicle width direction.

2. The image processing apparatus for a vehicle according to claim 1, comprising:
    a partition line detection portion detecting a partition line on a road, wherein
    in a case where the partition line is not detected by the partition line detection portion, the additional-image generation portion generates the first marking image serving as the additional image.

3. The image processing apparatus for a vehicle according to claim 2, wherein the additional image includes a second marking image indicating a second line arranged between the end portion of the vehicle in the vehicle width direction and the first line, and the second line is along the vehicle front and rear direction.

4. The image processing apparatus for a vehicle according to claim 1, wherein the additional image includes a third marking image indicating a band-shaped region positioned in the vehicle width direction of the vehicle and extended in the vehicle front and rear direction.

* * * * *